O. L. OLSON.
MOWING MACHINE FOR RAILROAD USE.
APPLICATION FILED MAR. 14, 1908.
914,870.
Patented Mar. 9, 1909.
4 SHEETS—SHEET 3.
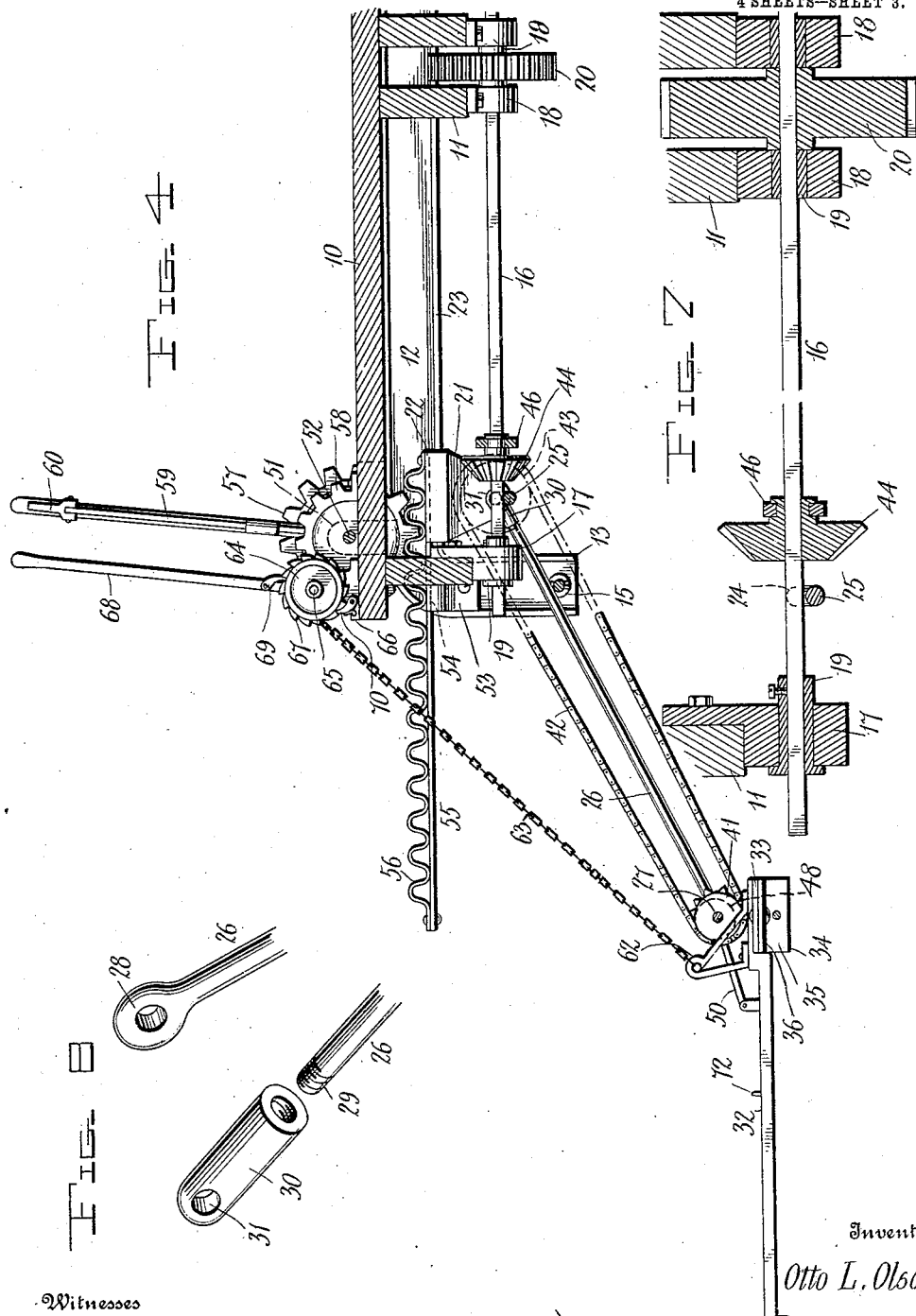
Witnesses
Inventor
Otto L. Olson
By
Attorneys O. L. OLSON.
MOWING MACHINE FOR RAILROAD USE.
APPLICATION FILED MAR. 14, 1908.
914,870.
Patented Mar. 9, 1909.
4 SHEETS—SHEET 4.
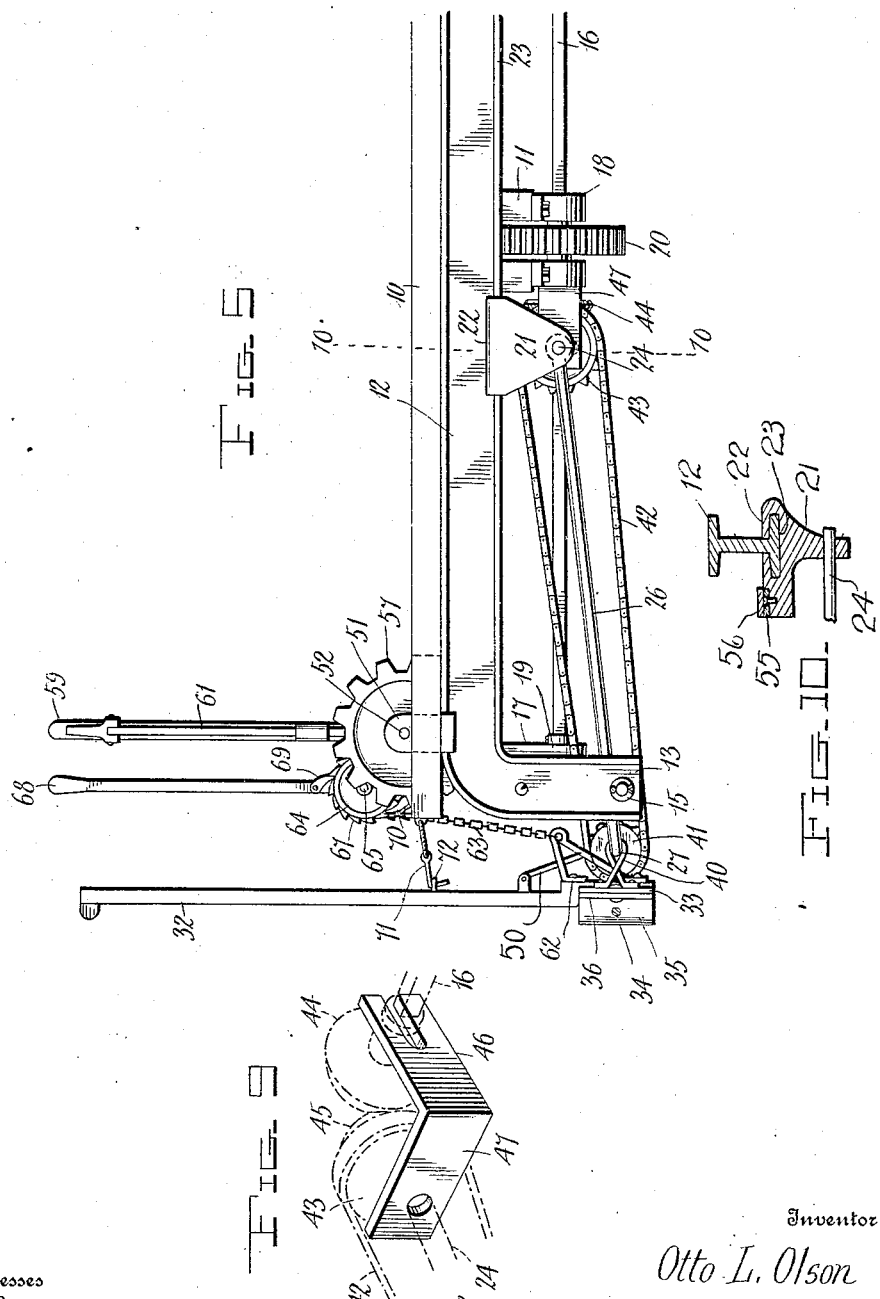
Witnesses
Inventor
Otto L. Olson
By 
Attorneys

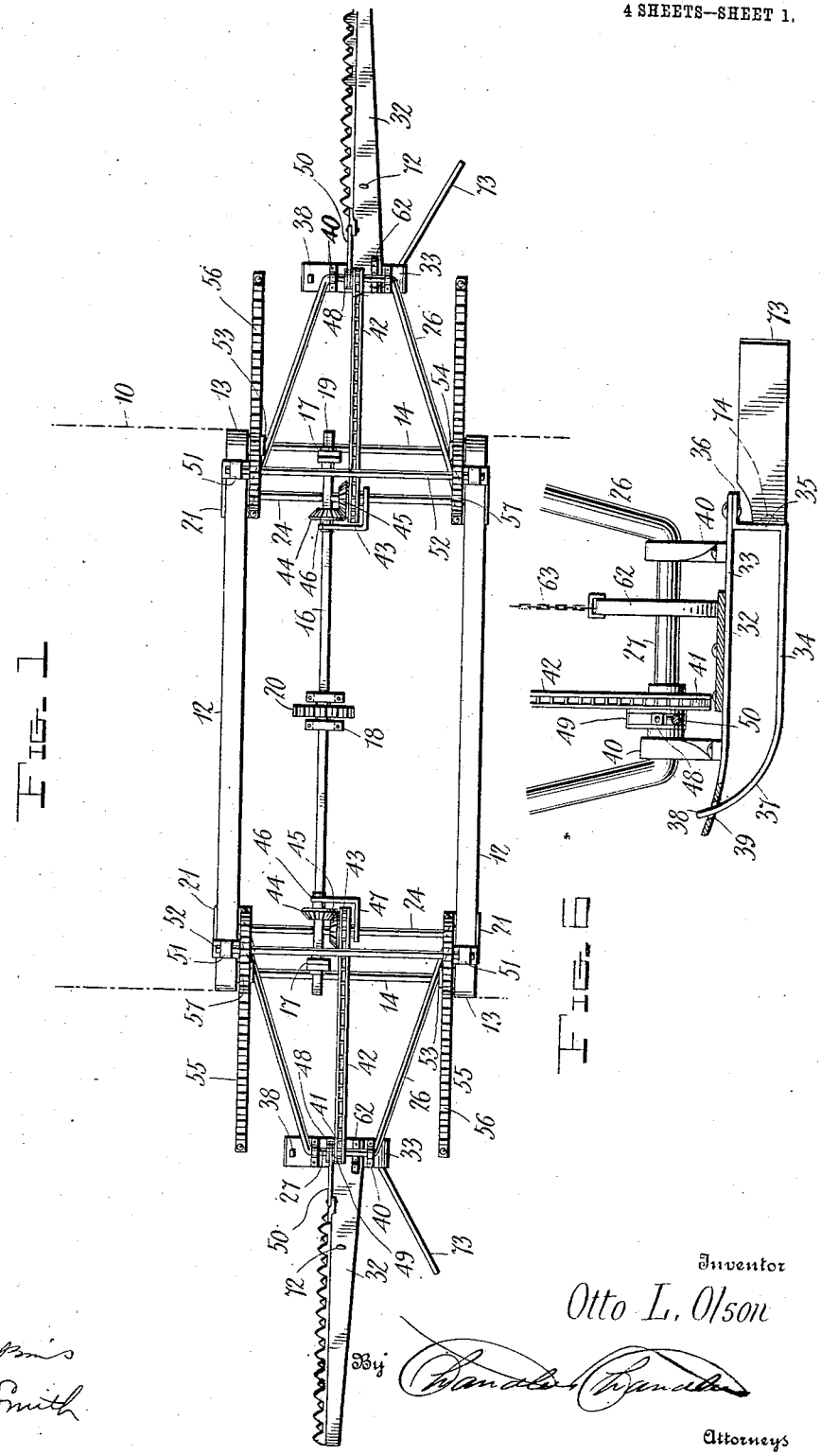

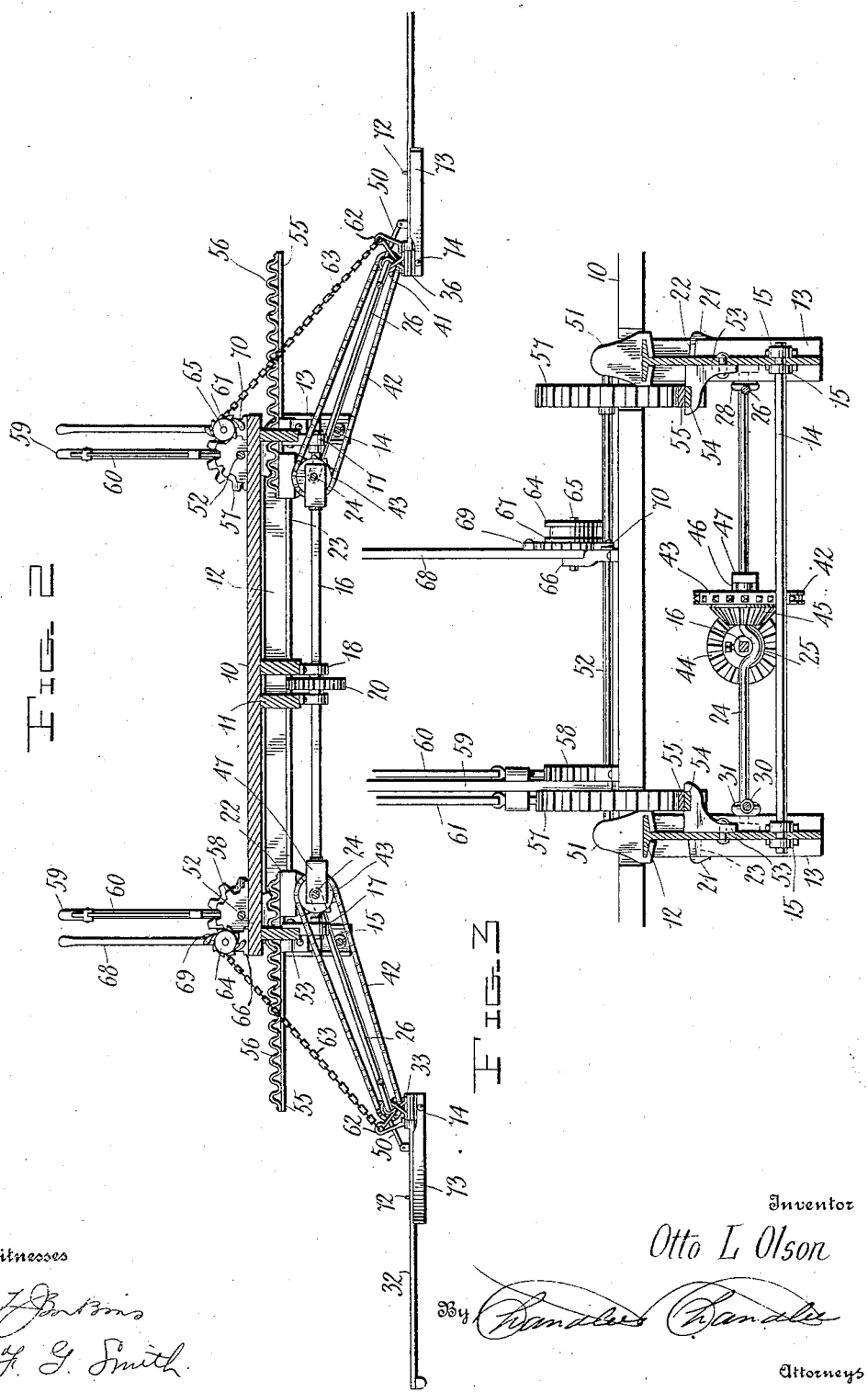

UNITED STATES PATENT OFFICE.

OTTO L. OLSON, OF LITTLE FALLS, MINNESOTA.

MOWING-MACHINE FOR RAILROAD USE.

No. 914,870. Specification of Letters Patent. Patented March 9, 1909.

Application filed March 14, 1908. Serial No. 421,081.

*To all whom it may concern:*

Be it known that I, OTTO L. OLSON, a citizen of the United States, residing at Little Falls, in the county of Morrison, State of Minnesota, have invented certain new and useful Improvements in Mowing-Machines for Railroad Use; and I do hereby declare the following to be a full, clear, and exact description of the invention, such as will enable others skilled in the art to which it appertains to make and use the same.

This invention relates to a mowing machine for railroad use it being designed for the purpose of cutting the weeds or grass growing to the sides of a railroad road-bed.

The machine embodying my invention may be briefly described as comprising a truck, frames mounted within the truck and movable to extend beyond each side thereof or retractable to position beneath the truck, sickle bars connected with the frames in such a manner that they may be swung upwardly, means for shifting the frames as above stated, and means for swinging the sickle bars vertically at the time the frames are retracted.

In the accompanying drawings, Figure 1 is a top plan view of the machine, Fig. 2 is a vertical transverse sectional view therethrough, Fig. 3 is a side elevation, parts being shown in section, Fig. 4 is a vertical transverse sectional view in detail through one side of the machine, Fig. 5 is a rear elevation, the sickle bar being raised and but substantially one-half of the machine being shown, Fig. 6 is a detail view of the shoe for supporting the sickle bar and showing also the lower end portion of the frame to which the sickle bar is connected, Fig. 7 is a detail longitudinal sectional view taken in a plane with the drive shaft for the machine, Fig. 8 is a group view of the upper ends of one of the frames to which the sickle bars are connected, and, Fig. 9 is a detail perspective view of a portion of the gearing of the machine. Fig. 10 is a vertical section taken on the line 10—10, Fig. 5.

In the drawings, the numeral 10 denotes the floor of the truck which supports the mechanism embodied in the invention and 11 the under sills of the truck. Bolted or otherwise secured upon the under side of the floor 10 of the truck are eye beams 12 these beams having their ends turned downwardly at right angles to their attached portions as at 13. The beams are spaced and braced by means of two tie rods 14 one rod being engaged at its ends through the lower ends of the right angularly and downwardly bent portions 13 of the beams at each side of the machine there being collars 15 engaged upon the ends of the tie rods upon each side of the webs of the eye beams so as to brace the beams as stated.

The drive shaft of the machine is indicated by the numeral 16, is square, and is journaled in suitable bearings 17 located one at each side of the floor of the car and also in intermediate bearings 18 located at the middle of the said floor, there being suitable wear sleeves 19 upon the shaft and working in each bearing as is usually the case in the journaling of a square shaft. A gear 20 is fixed upon the shaft between the bearings 18 and this gear forms one element of a system of motor-driven gearing (not shown), the said gearing and the motor for driving the same serving, if desired, as a means both for propelling the car or machine and for operating the cutting apparatus. The motor is not shown as it forms no part of the invention but it will be understood that the desired arrangement of car driving gearing may be had without interfering in any way with the system of gearing which is driven from the shaft 16 for the operation of the cutting apparatus. Bearings 21 are formed at their upper ends each with a pair of flanges 22 which are directed in opposition to each other and which receive between them the lower flange 23 of the corresponding eye beam 12, it being understood that there are two pairs of these bearings provided, one pair at each side of the machine, and mounted at its ends in the bearings of each pair is a shaft 24 which is non-rotatable and which has a bend 25 formed in it to receive the shaft 16 the two shafts being in this manner mounted in the same plane. It will be readily understood that the bearings 21 are shiftable, together with the shaft they support, transversely of the machine and upon the eye beam 12 from which they are supported and it is to these shafts 24 that the frames to which the sickle bars are connected, are attached.

The frames mentioned above are formed each of a length of metallic rod bent to form side portions 26 which converge toward a connecting portion 27 comprising a part of each frame. The end of one side portion of each frame is formed with an integral eye 28 through which one end of the shaft 24 is passed and the end of the other side portion is threaded as at 29 and has engaged upon it a sleeve 30 formed with an eye 31 through which the other end of the shaft 24 passes. By threading the end of one side portion of each frame as at 29 and engaging thereon the sleeve 30 formed with the eye 31, certain bearings through which the connecting portion 27 passes, may be engaged upon or disengaged from the frame as one end of the frame is in this manner free from enlargements.

The frames just described rest upon the tie rods 14 at the corresponding side of the machine and it will be understood that when the bearings 21 are shifted inwardly, the frames will be pulled in a corresponding direction and by reason of the fact that they rest upon the tie rods 14, will gradually have their outer ends raised the final position of the frames being clearly shown in Fig. 5 of the drawings.

The sickle bars of the machine are indicated by the numeral 32 and are of the ordinary construction except as regards the inner shoe which element I have specially designed to suit the conditions under which the sickle bar is to be used, this shoe being formed or comprised of an upper plate 33 to which the sickle bar 32 has its inner end bolted or otherwise secured and a ground plate 34 which has its rear portion turned upwardly as at 35 at right angles to its body portion and thence rearwardly at right angles to its portion 35 as at 36 and bolted to the rear end of the top plate 33. The ground plate 34 has its forward portion curved upwardly and forwardly as at 37 and the extreme upper end of this portion of the ground plate is reduced in width as at 38 and engaged through a slot 39 formed transversely in the top plate 33 adjacent the forward end thereof. The connecting portion 27 of each frame is loosely engaged through bearings 40 which are bolted or otherwise secured upon the upper face of the upper plate it being understood that the sickle bars are in this manner connected for vertical swinging movement with respect to their respective frames and that the inner ends of the sickle bars are supported in the proper manner for travel over the surface of the ground.

A sprocket gear 41 is journaled for rotation upon the connecting portion 27 of each frame and is geared by means of a sprocket chain 42 with a similar gear 43 upon the shaft 24, this latter gear being formed with a beveled gear portion which meshes with a beveled gear 44 upon the shaft 16, the gear 44 being held in operative engagement with the beveled gear 45 of the sprocket 43 by means of a bracket including right angularly extended portions 46 and 47 through the ends of which are respectively engaged the shafts 16 and 24, it being understood that this engagement of the arms of the bracket with the shafts and behind the gears permits of the shafts 24 moving inwardly without disconnecting the gear 45 from the gear 44 the gear 44 being carried in a like direction as it is confined between the end of the arm 46 and the gear 45. The gear 41 is formed with an integral eccentric 48 around which is engaged the usual strap 49 formed with the pitman 50 which is pivoted at its outer end between ears formed upon the knife bar of the sickle, it being understood that by the system of gearing just described, the knives of the two sickle bars are reciprocated.

As has heretofore been mentioned, it is intended that the bearings 21 be shifted upon the eye beams from which they are supported and in order that they may be so shifted, I have provided a manually operable means which will now be described. Bearings 51 similar to the bearings 21 are fixed one upon each eye beam at each end thereof so that there is a pair of such bearings at each side of the machine and journaled in each pair of bearings is a shaft 52. Brackets 53 are secured to the downturned ends of the eye beams and project in opposition with respect to each other and these brackets have the upper edges of their projecting wings recessed as at 54 for the slidable reception of a rack bar 55, this bar being made up of a base or body bar and a corrugated bar 56 which is secured thereto and forms the rack proper. In addition to working in the brackets 53, the inner ends of the rack bars are secured to the corresponding bearings 21 and fixed upon each shaft 52 are two pinions 57 one pinion meshing with each rack bar. The shafts 52 are journaled also in segmental racks 58, there being one of these racks located directly rearwardly of the forward one of each pair of pinions 57 at each side of the machine and loosely mounted for transverse rocking movement upon each of the shafts 52 between the forward pinion 57 thereon and the related segmental rack 58 is a lever 59 carrying a hand operated pawl mechanism 60 for coöperation with the rack 58 and a similar mechanism 61 for coöperation with the pinion 57 it being understood that by repeatedly rocking the lever, the pinions at that side of the machine will be rotated and being in mesh with the rack bars, will result in the said bars being shifted either inwardly or outwardly to extend or retract the frame at that side of the machine, it being also understood that after the rack bars have been moved inwardly or outwardly to the required distance, they will be held in such position by reason of the engagement of the pawl of the pawl mechanism 60 with the segmental rack 58, it being understood of course that the pawl of the pawl mechanism 61 is already in engagement with the pinion 57.

Having described the means for retracting and projecting the frames to which the sickles are connected, I will now described the means whereby the sickles may be swung to vertical position after the frames have been retracted, this being done to permit of the machine passing an obstruction along the roadway such for example as a station platform or a car or a parallel track.

Bolted to the upper plate 33 of the shoe and to the inner end of the sickle bar is an upstanding bracket 62 and connected to this bracket, or rather to the one at each side of the machine is a chain 63 which is passed around a drum 64 mounted upon a stub shaft 65, this shaft projecting laterally from a stationary bracket 66 upon the floor of the car. Formed integral with or secured to the drum is a ratchet 67 and mounted for free rocking movement upon the shaft between one face of this ratchet and the opposing face or side of the bracket 66 is a lever 68 carrying a pawl 69 which is pivoted and rests in engagement with the ratchet 67, it being understood that by oscillating the lever, the ratchet together with the drum upon which it is carried, will be rotated to wind the chain thereon and consequently swing the sickle bar vertically. A spring pressed pawl 70 is pivoted to the bracket 66 and is held by its spring at all times in engagement with the ratchet except when it is moved manually to release the ratchet and permit unwinding of the drum. The position assumed by the sickle bars when raised, is shown clearly in Fig. 5 of the drawings, the bars being held in raised position by means of hooks and eyes 71 and 72 respectively, the first being connected with the car floor at the side edges thereof and the second being formed upon the sickle bars at the proper point.

In order that the weeds, after being cut, may be swept away from the tracks, a sweep board 73 is secured by means of a single bolt 74 to the vertically extending portion 35 of each shoe and projects rearwardly in an oblique direction therefrom and travels over the ground behind the sickle bars, it being understood that the single bolt permits the sweep board to swing vertically should it strike an obstruction.

From the foregoing description of my invention it will be seen that I have provided a machine for the purpose heretofore described, which while simple in construction, is undoubtedly very efficient and will prove a means of economizing in the accomplishment of the work for which it is designed.

What is claimed, is:—

1. A machine of the class described comprising a truck, a frame at each side thereof, beams mounted beneath the floor of the truck, brackets slidable upon the beams and having the frames connected thereto and slidable therewith to lie beneath the floor of the truck, rack bars connected with the brackets, pinions meshing with the rack bars and rotatable to shift the same together with the brackets to which they are connected, and cutting apparatus carried by each frame.

2. A machine of the class described comprising a truck, a frame slidably mounted at the side thereof, means whereby the frame may be advanced to project from the side of the truck and retracted to lie beneath the floor of the truck, and a cutting apparatus connected to the frame.

3. A machine of the class described comprising a truck, a frame slidably mounted at the side thereof, means whereby the frame may be advanced to project from the side of the truck and retracted to lie beneath the floor of the truck, a cutting apparatus connected to the frame for swinging movement with respect thereto, and means whereby said cutting apparatus may be swung.

4. A machine of the class described comprising a truck, a frame slidably mounted at the side thereof, means whereby the frame may be advanced to project from the side of the truck and retracted to lie beneath the floor of the truck, a cutting apparatus connected to the frame for vertical swinging movement with respect thereto, and means whereby said cutting apparatus may be swung.

5. A machine of the class described comprising a truck, a frame at the side thereof, slides mounted beneath the floor of the truck, brackets mounted on the slides and having the frame connected thereto and movable therewith to lie beneath the floor of the truck, and a cutting apparatus carried by the frame.

6. A machine of the class described comprising a truck, a frame slidably and pivotally mounted at the side thereof, means whereby the frame may be advanced to project from the side of the truck and retracted to lie beneath the same, means for swinging the frame on its pivot when it is advanced and retracted, and a cutting apparatus connected to the frame.

7. A machine of the class described comprising a truck, a frame pivotally and slidably mounted at the side thereof, means whereby said frame may be advanced to project from the side of the truck and retracted to lie beneath the same, a cutting apparatus connected to the frame, and a support engaging the frame between its pivot and the cutting apparatus, said support being located at a level which is below the level of the pivot, whereby the frame will be raised and lowered when it is retracted and advanced.

In testimony whereof, I affix my signature, in presence of two witnesses.

OTTO L. OLSON.

Witnesses:
   FRANK SAUG,
   M. S. JACOBSON.